United States Patent [19]
Berryman et al.

[11] Patent Number: 6,147,497
[45] Date of Patent: Nov. 14, 2000

[54] USING ELECTRICAL IMPEDANCE TOMOGRAPHY TO MAP SUBSURFACE HYDRAULIC CONDUCTIVITY

[75] Inventors: James G. Berryman, Danville; William D. Daily, Livermore; Abelardo L. Ramirez, Pleasanton; Jeffery J. Roberts, Livermore, all of Calif.

[73] Assignee: The Regents of the University of California, Oakland, Calif.

[21] Appl. No.: 09/106,405

[22] Filed: Jun. 29, 1998

[51] Int. Cl.$^7$ .............................. G01V 3/06; G01V 3/24; G01V 3/36; G01N 15/08; G01R 27/02
[52] U.S. Cl. ..................... 324/357; 324/364; 324/366; 324/372; 324/376; 324/693; 324/715
[58] Field of Search ............................ 324/323, 324, 324/335, 357, 360, 362–366, 371, 372, 376, 693, 709, 713, 715, 717; 73/38, 152.05–152.09, 152.11

[56] References Cited

U.S. PATENT DOCUMENTS

| | | | |
|---|---|---|---|
| 2,988,690 | 6/1961 | Love et al. | 324/357 |
| 4,359,687 | 11/1982 | Vinegar et al. | 324/362 X |
| 4,644,283 | 2/1987 | Vinegar et al. | 324/376 |
| 4,686,477 | 8/1987 | Givens et al. | 324/376 X |
| 5,325,918 | 7/1994 | Berryman et al. | |
| 5,346,307 | 9/1994 | Ramirez et al. | |
| 5,495,175 | 2/1996 | Ramirez et al. | 324/357 |
| 5,503,001 | 4/1996 | Wong | 324/376 X |
| 5,661,406 | 8/1997 | Daily et al. | |
| 5,914,603 | 6/1999 | Daily et al. | 324/357 |

*Primary Examiner*—Gerard Strecker
*Attorney, Agent, or Firm*—L. E. Carnahan; John P. Wooldridge; Alan H. Thompson

[57] ABSTRACT

The use of Electrical Impedance Tomography (EIT) to map subsurface hydraulic conductivity. EIT can be used to map hydraulic conductivity in the subsurface where measurements of both amplitude and phase are made. Hydraulic conductivity depends on at least two parameters: porosity and a length scale parameter. Electrical Resistance Tomography (ERT) measures and maps electrical conductivity (which can be related to porosity) in three dimensions. By introducing phase measurements along with amplitude, the desired additional measurement of a pertinent length scale can be achieved. Hydraulic conductivity controls the ability to flush unwanted fluid contaminants from the surface. Thus inexpensive maps of hydraulic conductivity would improve planning strategies for subsequent remediation efforts. Fluid permeability is also of importance for oil field exploitation and thus detailed knowledge of fluid permeability distribution in three-dimension (3-D) would be a great boon to petroleum reservoir analysts.

9 Claims, 2 Drawing Sheets

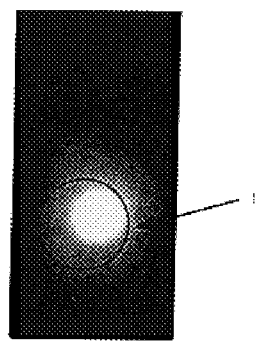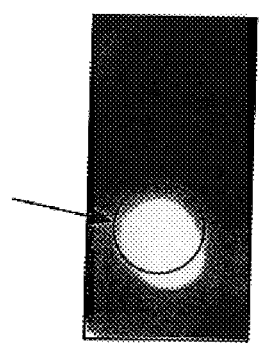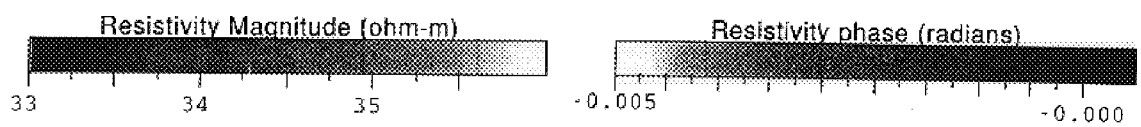
FIG. 2A          FIG. 2B

USING ELECTRICAL IMPEDANCE TOMOGRAPHY TO MAP SUBSURFACE HYDRAULIC CONDUCTIVITY

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to mapping subsurface hydraulic conductivity, particularly to the use of Electrical Impedance Tomography (EIT) for mapping subsurface hydraulic conductivity, and more particularly to using Electrical Resistance Tomography (ERT) to characterize and map hydraulic conductivity using measurements of both amplitude and complex phase, thus generalizing ERT to EIT.

ERT has been established as a useful tool for imaging electrical conductivity variations in the earth. The source field is established through current injection using electrodes inserted into the ground. The current is often injected via electrodes in one borehole, while the measured changes in electrical potential are observed in another, distant borehole. However, the method may also be used successfully in combination with surface sources and/or receivers. The goal of the ERT procedure is to image electrical conductivity variations in the earth, much as x-ray tomography is used in image density variations through cross-sections of the body. Although the electrical conductivity is a particularly useful quantity to measure, nevertheless it is often not the conductivity that one really wants to measure. Other parameters of the underground environment are of more direct interest, such as porosity, fluid saturation, and hydraulic conductivity. ERT has also been shown to be effective in measuring/inferring temperatures underground, see U.S. Pat. No. 5,346,307, issued Sep. 13, 1994, to A. L. Ramirez et al.

Electrical logging has long been used in the petroleum and environmental industries to measure the electrical conductivity in the region surrounding a borehole. This data, which is used to estimate pore-fluid saturations near a well, is very sensitive to variations in rock pore fluid. Mapping near-surface variation of conductivity has also been found to be a very sensitive indicator of zones of higher salinity and acidity in many shallow environmental studies.

Recent research at the Lawrence Livermore National Laboratory (LLNL) and elsewhere has developed instrumentation and software to deploy ERT imaging capabilities in both crosshole and surface-to-borehole configurations, thereby extending the conductivity information to the region between boreholes. Both 2-D and 3-D images have been successfully obtained and used to monitor both conductive and resistive plumes of fluid contaminants. The results have shown that subsurface conductivity is determined at a much higher resolution than can be achieved with surface techniques alone and much greater penetration than can be achieved with ground penetrating radar (GPR) technology.

There have been many attempts to relate hydraulic conductivity (also called fluid permeability or Darcy's constant) to electrical conductivity and/or formation factor measurements in rocks. It is well known that these efforts have had only very limited success. The physical reason for this lack of success is related to the fact that electrical conductivity is a scale-invariant property of the porous medium, just as the porosity is a scale-invariant property. This fact means that it could be possible (at least in principle) to relate these two scale-invariant properties, and the resulting well-known relation is Archie's law giving formation factor as a power of porosity. See G. E. Archie, "The Electrical Resistivity Log as an Aid in Determining Some Reservoir Characteristics," Trans. AIME, 146, 54–62, 1942. On the other hand, it is also well known that the permeability is not a scale-invariant property. The permeability depends not only on the porosity but also on the grain size (or pore size or throat size, if you prefer). Grain size distribution is a property that varies with scale. Thus at least two measurements are needed to specify permeability; formation factor or porosity by themselves are not sufficient to determine the permeability-not even in principle. The second measurement that is required is one that determines an appropriate length scale.

There has been considerable effort in recent years to show that a length scale pertinent for porous media can be determined in principle by using electrical measurements alone. See Johnson, et al., 1986 (D. L. Johnson, et al., New Pore-Size Parameter Characterizing Transport in Porous Media, Phys. Rev. Lett., 57, 2564–2567, 1986), Johnson et al., 1987 (D. L. Johnson et al., Theory of Dynamic Permeability and Tortuosity in Fluid-Saturated Porous Media, J. Fluid Mech., 176, 379–402, 1987), and Avellaneda et al., 1991 (M. Avellaneda et al., Rigorous Link Between Fluid Permeability, Electrical Conductivity, and Relaxation Times for Transport in Porous Media, Phys. Fluids A, 3, 2539–2540, 1991). However, these methods require more information than is usually available for a given situation in the field. For example, to use the ideas of Johnson et al. (1986) requires a series of experiments using saturating fluids at different levels of salinity, which is impractical for field applications. A somewhat more promising approach has been suggested by Börner et al., 1996 (F. D. Börner et al., Evaluation of Transport and Storage Properties in the Soil and Groundwater Zone from Induced Polarization Measurements, Geophys. Prospecting, 44, 583–601, 1996) in which complex electrical conductivity measurements (i.e., frequency-dependent measurements including both amplitude and phase) provide the two pieces of information required to determine the permeability. The physical principles underlying the analysis in the approach of Börner et al. (1996) are not as well-founded, however, as is that of the earlier references already mentioned.

The present invention will broaden the applicability of the ERT method to include measurements of hydraulic conductivity. The invention combines theoretical and experimental results to characterize and map hydraulic conductivity using measurements of both amplitude and complex phase, thus generalizing ERT to EIT. Hydraulic conductivity is known to be logistically difficult and expensive to measure by virtually all existing methods. Yet this important parameter controls the ability to flush unwanted contaminants from the ground or to extract commercially desirable fluids, such as oil and gas, from underground reservoirs. Inexpensive maps of hydraulic conductivity, even if relatively crude ones, will be of great help in improving planning strategies for the subsequent remediation efforts or for reservoir exploitation.

As pointed out above, both 2-D and 3-D images can be successfully obtained and used to monitor both conductive and resistive plumes of fluid contaminants, and the results have shown that subsurface conductivity is determined at a much higher resolution than can be achieved with surface techniques alone and much greater penetration than can be achieved with GPR technology. Utilizing the present invention, similar results for hydraulic conductivity can be achieved by making 3-D maps based on ERT/EIT data. This invention is a major advance both in terms of economy and in terms of imaging capability, because current methods of imaging hydraulic conductivity generally obtain only averages with fairly narrow layers rather than true localized hydraulic conductivity measurements. The present invention involves making complex electrical conductivity measurements in a manner similar to that suggested by Börner et al. (1996), but to analyze those results in terms of the so-called "lambda parameter" of Johnson et al. (1986; 1987). The lambda parameter (Λ) is a direct measure of the appropriate length scale of the porous medium; i.e., the scale pertinent to fluid flow. The analysis shows the required two parameters (for example, Λ and electrical conductivity σ) can be obtained by examining both amplitude and phase in a frequency-dependent electrical conductivity measurement.

SUMMARY OF THE INVENTION

It is an object of the present invention to map subsurface hydraulic conductivity.

A further object of the invention is to utilize EIT to map subsurface hydraulic conductivity.

A further object of the invention is to provide measurements of both amplitude and phase to enable EIT to be used to map hydraulic conductivity in the subsurface.

Another object of the invention is to provide a method and means for introducing phase measurements along with amplitude whereby the measurement of a pertinent length scale can be achieved to enable hydraulic conductivity mapping.

Another object of the invention is to combine theoretical and experimental results to characterize and map hydraulic conductivity using measurements of both amplitude and complex phase, thus generalizing ERT to EIT.

Another object of the invention is to map subsurface hydraulic conductivity by making complex electrical conductivity measurements and analyzing those results in terms of the so-called "lambda parameter."

Other objects and advantages of the present invention will become apparent from the following description and the accompanying drawings. The present invention involves using EIT to map subsurface hydraulic conductivity. The present invention broadens the applicability of the ERT method for imaging electrical conductivity in three-dimensional regions underground, for example, to include measurements of hydraulic conductivity. The invention combines theoretical and experimental results to characterize and map hydraulic conductivity using measurements of both amplitude and complex phase, thus generalizing ERT to EIT. This invention involves making complex electrical conductivity measurements in a manner similar to that suggested by Börner et al., 1996, referenced above, but analyzing those results in terms of the so-called "lambda parameter" of Johnson et al., 1986, referenced above. The lambda parameter is a direct measure of the appropriate length scale of the porous medium, the scale pertinent to both electrical current and liquid flow. The analysis shows the required two parameters (amplitude and phase) can be obtained by examining both amplitude and phase in a frequency dependent electrical conductivity measurement. By introducing phase measurements along with amplitude, the desired additional measurement of a pertinent length scale can be achieved.

BRIEF DESCRIPTION OF THE DRAWINGS

The accompanying drawings, which are incorporated into and form a part of the disclosure, illustrate the invention and, together with the description, serve to explain the principles of the invention.

FIGS. 2A and 2B show magnitude and phase tomographs obtained in a water tank where an anomaly was created by inserting a sand-and-lead pellet mixture.

DETAILED DESCRIPTION OF THE INVENTION

Figure 1:
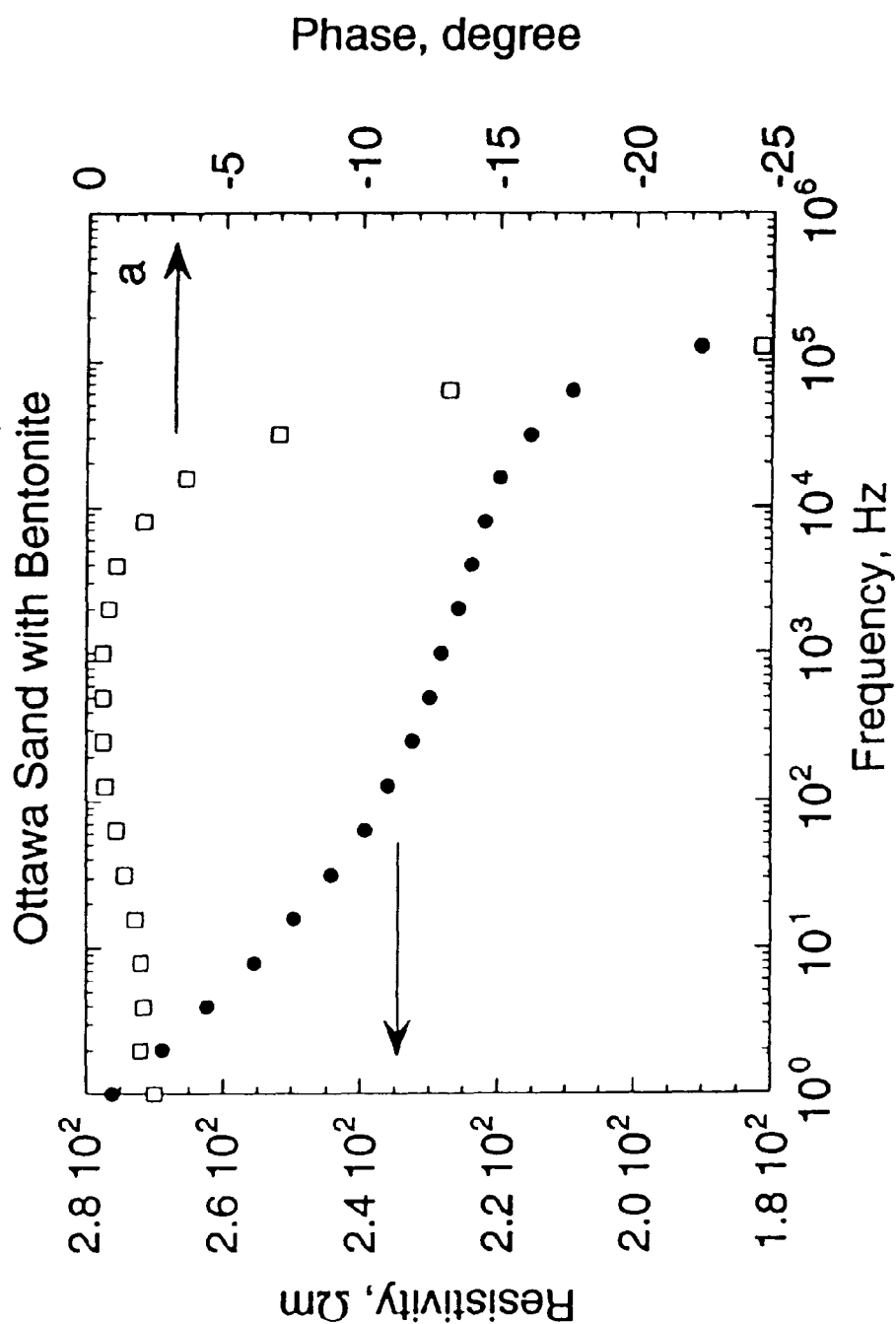
FIG. 1 graphically illustrates electrical impedance data collected on saturated sand/clay mixtures by plotting resistivity and phase as a function of frequency, with a frequency range of $10^0$ to $10^5$ Hz.

The present invention involves the use of EIT to map subsurface hydraulic conductivity. It has been determined that when measurements of both amplitude and phase are made, EIT can be used to map hydraulic conductivity in the subsurface. Hydraulic conductivity is a parameter that controls the ability to flush unwanted contaminants from the ground or to retrieve commercially desirable fluids, such as oil and gas from underground reservoirs. Thus inexpensive maps of hydraulic conductivity, even if relatively crude, would improve planning strategies for remediation and exploitation efforts. Fluid permeability is of special importance to oil field exploitation, and detailed knowledge of fluid permeability distribution in 3-D would be a great boon to petroleum reservoir analysis and management.

The present invention will broaden the applicability of the ERT method to include measurements of hydraulic conductivity. The invention combines theoretical and experimental results to characterize and map hydraulic conductivity using measurements of both amplitude and complex phase, thus generalizing ERT to EIT.

ERT is a method for imaging electrical conductivity in three-dimensional regions underground. To date, most of this work has been performed using DC or switched-DC current injection sources. However, some preliminary experiments measuring both amplitude and phase for frequency-dependent cases have been performed in efforts to measure the effects of VOC contamination in soils. Thus it has been established that such measurements can be done in practice. Furthermore, as pointed out above, LLNL ERT methods have been used successfully to measure/infer temperature underground, and the approach that will be taken to measure/infer fluid permeability has several features in common with those temperature measurements. It has been shown that similar results can be obtained for hydraulic conductivity by making 3-D maps based on ERT/EIT data, this will be a major advance both in terms of economy and in terms of imaging capability, because current methods of imaging hydraulic conductivity generally obtain only averages within fairly thin layers rather than true localized hydraulic conductivity measurements.

This invention involves making complex electrical conductivity measurements similar to ones suggested by Börner et al., 1996, referenced above, but analyzing those results in terms of the so-called "lambda parameter" of Johnson et al., 1987, referenced above. The lambda parameter is a direct measure of the appropriate length scale of the porous medium, the scale pertinent to fluid flow. The analysis shows the required two parameters can be obtained by examining both amplitude and phase in a frequency dependent electrical conductivity measurement. By introducing phase measurements along with amplitude, the desired additional measurement of a pertinent length scale can be achieved and hydraulic conductivity in the subsurface can be mapped using EIT.

To provide a better understanding of the invention, as well as supplying background for the combining of theoretical and experimental results to characterize and map hydraulic conductivity using measurements of both amplitude and complex phase thereby generalizing ERT to EIT, the description includes the following theoretical background section.

Theoretical Background

The use of Kozeny-Carman formulas such as $$k_0 = \frac{\phi^2}{2s^2 F} \quad (1)$$

to estimate permeability $k_o$ from measurements of porosity $\phi$, specific surface area s, and formation factor $F \equiv \sigma f / \sigma$ (where $\sigma f$ is the conductivity of the saturating pore fluid and $\sigma$ is the effective overall conductivity of the fluid-saturated porous medium) are well-known in the literature. These methods do correctly account for several features of the permeability, including the fact that the permeability is expected to increase with increasing porosity $\phi$ (other factors remaining constant), to decrease with increasing tortuosity $\alpha$ or formation factor $F=\alpha/\phi$, and to decrease with increasing specific surface area s. The tortuosity and formation factor are both dimensionless and quantify the effect the microstructure of the pore space has on the transport of liquids. The dependence of Kozeny-Carman-style formulas on s is especially important, as this is the factor that determines the length scale, which is critical in estimating overall permeability $k_o$, a quantity itself having the dimensions of length squared.

Nevertheless, these methods have often been criticized precisely because either the specific surface area, or the hydraulic radius, or some other measure of the pertinent length scale is so critical and yet so poorly related in most cases to the actual length scale pertinent to fluid flow.

Berryman et al., 1987 (Kozeny-Carman Relations and Image Processing Methods for Estimating Darcy's Constant, J. Appl. Phys., 62, 2221–2228, 1987) show, for example, that the pertinent length scale cannot be simply related to the "true" specific surface area obtained from BET or nitrogen adsorption because it is easy to show that two porous media, one having a very smooth internal surface and another having a very rough (say fractal) internal surface can have virtually the same permeability if the scale of the roughness is itself much smaller than the pertinent scale of the fluid flow, even though the specific surface areas of the two media may differ by orders of magnitude.

The Lambda Parameter.

Johnson et al., 1986, referenced above, were partially motivated by similar concerns to consider what might be the pertinent length scale for electrical conduction in porous media saturated with conducting fluid. They determined that a key parameter in such media is the so-called lambda parameter $\Lambda$, which is defined by $$\frac{2}{\Lambda} = \frac{\int |\nabla \psi(x)|^2 dS}{\int |\nabla \psi(x)|^2 dV_p}, \quad (2)$$

where $\psi(x)$ is the microscopic electrical potential, dS is an infinitesimal surface element on the pore surface, and $dV_p$ is an infinitesimal volume element in the pore volume. Thus $2/\Lambda$ is the "effective" surface to volume ratio with a weight function depending on the square of the electrical field magnitude $|E|=|-\nabla \psi|$ at each point of the pore surface or pore volume. In the special case when the potential gradient is constant, the lambda parameter reduces exactly to $2\phi/s$, since the right-hand side of equation (2) reduces in this case to $s/\phi$. The authors go on to show that to a good approximation one should expect in many situations that $k_o \cong \Lambda^2/8F$, which compares favorably to (1) if allowance is made for the need to do some interpretation of the factor s appearing in (1).

In related work, Johnson et al., 1987, referenced above, go on to develop a complete, physically-based, model of dynamic permeability and tortuosity in porous media. They point out that if a macroscopic pressure gradient, $\nabla P$ exp $(-j\omega t)$ is applied to a porous sample, then the response can be expressed in terms of the averaged fluid velocity $vf(\omega)$, which satisfies $$\tilde{\alpha}\rho_f = \frac{\partial v_f}{\partial t} = -\nabla P, \phi v_f = -\frac{\tilde{k}(\omega)}{\eta}\nabla P. \quad (3)$$

When these two relations are compared, it is easy to see that $$\tilde{\alpha}(\omega) = \frac{j\eta\phi}{\tilde{k}(\omega)\omega\rho_f}. \quad (4)$$

The various symbols appearing in these formulas are the dynamic tortuosity $\alpha(\omega)$, the dynamic permeability $\tilde{k}(\omega)$, $j=\sqrt{-1}$, $\omega=2\pi f$ is the angular frequency, $\phi$ is the porosity, $\rho f$ is the fluid density, and $\eta$ is the fluid viscosity. This work is also related to work by Brown, 1980 (R. J. S. Brown, Connection Between Formation Factor for Electrical Resistivity and Fluid-Solid Coupling Factor in Biot's Equations for Acoustic Waves in Fluid-Filled Porous Media, Geophysics, 45, 1269–1275, 1980), who had shown that electrical tortuosity and mechanical/inertial coupling terms in Biot's equations (M. A. Biot, Theory of Propagation of Elastic Waves in a Fluid-Saturated Porous Solid, J. Acoust. Soc. Am. 28, 168–191, 1956) are related in similar fashion. Then, the main results of Johnson et al., 1987, state that $$\tilde{\alpha}(\omega) = \alpha_\infty + \frac{j\eta\phi}{\omega k_0 \rho_f}\left[1 - \frac{4j\alpha_\infty^2 k_0^2 \rho_f \omega}{\eta \Lambda^2 \phi^2}\right]^{\frac{1}{2}} \quad (5)$$

for the dynamic tortuosity and $$\tilde{k}(\omega) = \frac{k_0}{\left[1 - \frac{4j\alpha_\infty^2 k_0^2 \rho_f \omega}{\eta \Lambda^2 \phi^2}\right]^{\frac{1}{2}} - \frac{j\alpha_\infty k_0 \rho_f \omega}{\eta \phi}} \quad (6)$$

for the dynamic permeability. The new symbols appearing in these formulas are $k_o$, which is the low frequency (quasi-static) fluid permeability, $\alpha\infty=\phi F$, which is the high frequency tortuosity limit and $\Lambda$, which is again the lambda parameter defined previously. Eq. (5) shows that the effects of viscosity are negligible for electrical tortuosity at high enough frequencies, in agreement with arguments of Brown, 1980. Eq. (6) reduces correctly to the low frequency permeability $k_o$ at low frequencies and provides viscosity dependent corrections at higher frequencies. These results were shown to be in very good agreement with numerical simulations both by Johnson et al., 1987, and subsequently by various others.

If we could measure the frequency-dependent tortuosity directly, we could in principle determine the lambda parameter Λ. To see this, consider $$\ln(\tilde{\alpha} - \alpha_\infty)^2 = \ln\left(-\frac{\eta^2\phi^2}{k_0^2\rho_f^2\omega^2}\right) + \ln\left(1 - j4\alpha_\infty^2 k_0^2 \rho_f \frac{\omega}{\eta\Lambda^2\phi^2}\right) \quad (7)$$

The argument of the second logarithm on the right-hand side depends linearly on ω, so [since ln (1+jx)≅jx for small x] for sufficiently small ω the imaginary part of this expression is linear in ω. We find that $$\ln(\tilde{\alpha} - \alpha_\infty)^2 \simeq j\pi + 2\ln\left(\frac{\eta\phi}{k_0\rho_f\omega}\right) - j\frac{\Lambda^2\rho_f}{16\eta}\omega \equiv j\pi + A_r + jA_i, \quad (8)$$

where in this expression we have made use of the assumed form $k_o = \Lambda^2/8F$. Thus, when the tortuosity α has been measured, α∞ is known (or can be estimated from the frequency dependence of α), and the kinematic viscosity $\nu = \eta/\rho_f$ of the pore fluid is known, $\Lambda^2$ can be determined from the slope of the curve resulting from plotting the imaginary part of ln (α−α∞) versus frequency. Linearity of the curve is guaranteed by equation (7) for small values of ω. The sensitivity of this method depends on the magnitude of the ratio $A_i/A_r$ [see equation (8) for definitions], which will be a strong function of both permeability and frequency.

To test the usefulness of the tortuosity prediction (5) for real materials, we have done some sample calculations. We assumed the following values for the various parameters appearing in the equation: fluid density $\rho_f = 1000$ kg/m³, kinematic viscosity $\nu = 1.0 \times 10^{-6}$ m²/sec., viscosity $\eta = \nu\rho_f$, porosity $\phi = 0.283$, angular frequency $\omega = 2\pi \times f$ Hz (or rad/sec.). The ratio $k_0^2 \rho_f \omega / \eta \Lambda^2$ is dimensions. The high frequency tortuosity $\alpha\infty = \phi F$. We chose $\alpha\infty = 1.88$ and therefore F=6.64 for these calculations. For the sake of argument, we take $k_o = \eta^2/8F$.

TABLE 1. Sensitivity of tortuosity measurement depends on the ratio of $|A_i/A_r|$. Results are displayed for various choices of permeability ($k_o$=100 D, 1 D, 1 mD and 1 μD) and frequencies (f=1 mHz, 1 Hz, and 1 kHz). Sensitivity is improved by increasing the frequency for fixed permeability, but sensitivity decreases with decreasing permeability.

| Permeability $k_o$ (×10$^{-12}$m²) | Frequency f (Hz) | Ratio $|A_i/A_r|$ |
|---|---|---|
| 10² | 10⁻³ | 8.01 × 10⁻⁸ |
|  | 10⁰ | 1.76 × 10⁻⁴ |
|  | 10³ | 1.41 × 10⁻² |
| 10⁰ | 10⁻³ | 5.92 × 10⁻¹⁰ |
|  | 10⁰ | 1.00 × 10⁻⁶ |
|  | 10³ | 2.91 × 10⁻³ |
| 10⁻³ | 10⁻³ | 4.25 × 10⁻¹³ |
|  | 10⁰ | 6.07 × 10⁻¹⁰ |
|  | 10³ | 1.03 × 10⁻⁶ |
| 10⁻⁶ | 10⁻³ | 3.32 × 10⁻¹⁶ |
|  | 10⁰ | 4.36 × 10⁻¹³ |
|  | 10³ | 6.22 × 10⁻⁹ |

This Table shows that measurements of frequency-dependent tortuosity are most likely to be effective for larger permeabilities (1 mD to 100 D or more) and higher frequencies (1 Hz to 1 kHz or more). Permeabilities in the range 1 D to 100 D are not uncommon in contaminated gravels, and it is clear from these results that the proposed method will have greatest sensitivity in these situations for measurements in the 1 kHz frequency range. Lower permeabilities may be detectable, but they will challenge the ability of the experimenter to remove sources of spurious signals affecting the phase angles to be measured. For the electrical measurements to be discussed later, it will also be important to restrict the frequency range to frequencies significantly less than 1 MHz (e.g., 1 kHz) to avoid complications due to displacement currents (related to dielectric effects that are not of direct interest here), and for other practical reasons having to do with instrumentation used in the field experiments.

The tortuosity and the permeability are both physical quantities associated with mechanical flow of the pore fluid: tortuosity is a measure of the effects of inertial coupling to the solid, while permeability is a measure of the viscous coupling to the solid. For this reason, there is not an immediately obvious connection between the frequency-dependent electrical conductivity and these quantities. But there are well-known effects that do couple electrical and fluid kinetic effects. These physical phenomena are sometimes called electrokinetic effects, or electroseismic effects, or the complimentary phenomenon of the seismoelectric effect. The following briefly discusses the importance of these effects.

Electroseismic Effects.

A general description of electroseismic/seismoelectric coupling effects has been presented recently by Pride, 1994 (S. R. Pride, Governing Equations for the Coupled Electromagnetics and Acoustics of Porous Media, Phys. Rev. B, 50, 15678–15696, 1994). The simplified description presented here neglects several effects, but captures the spirit and the main issues important for this invention. In particular, we neglect any induced motion of the solid matrix and we neglect the streaming current, because it will not affect the measurements of magnitude and complex phase of the electrical conductivity. Then the coupled equations of interest can be written as the system $$\begin{pmatrix} \phi v_f \\ \phi J_c \end{pmatrix} = \begin{pmatrix} \tilde{k}(\omega)/\eta & L_m(\omega) \\ L_e(\omega) & \rho(\omega) \end{pmatrix} \begin{pmatrix} -\nabla P \\ -\nabla \psi \end{pmatrix}, \quad (9)$$

where $vf$ is the fluid velocity, $J_c$ is the conduction current, $L_e$ and $L_m$ are the cross-coupling coefficients. Pride, 1994, shows explicitly that $L_e(\omega) = L_m(\omega)$ in an appendix. Equality of these coupling coefficients is also expected from Onsager reciprocity. The remaining terms are defined as used previously.

These equations include, but generalize, the phenomena described previously. If there is a frequency-dependent applied pressure P and no applied electrical field ψ, then the first equation of this system is the same as presented previously, but now we see that a pressure gradient can also induce a conduction current through the coupling coefficient $L_m$. Similarly, when a frequency-dependent electrical field $-\nabla_\psi$ is applied to the system, then the second equation of the system shows that the normal conduction current arises, while the first equation shows that the fluid is also induced to flow through the coupling coefficient $L_e$. Therefore, liquid flow and electric current are intrinsically coupled.

To see why this is important for our problem, consider the case where the electric field is varied rapidly and the fluid is unable to respond so $vf \cong 0$. To a good approximation, one can then use (9) to show that the pressure satisfied $$\nabla P = \frac{\eta L_m}{\tilde{k}(\omega)} \nabla \psi \quad (10)$$

so $$\phi J_c = -\left(\sigma - \frac{\eta L_e L_m}{\tilde{k}(\omega)}\right) \nabla \psi \quad (11)$$

Then, using (5) we find that $$\phi J_c = -\left(\sigma - \frac{\eta L_e L_m \tilde{\alpha}(\omega) \rho_f \omega}{\phi}\right) \nabla \psi \equiv \sigma^*_{\mathit{eff}} E \quad (12)$$

showing the influence of the frequency-dependent tortuosity on the frequency dependent effective complex conductivity $\sigma^*_{\mathit{eff}}$ measured in such a system.

The coupling just described may not be the only source of complex conductivity in the systems of interest, but it is one possible source. Furthermore, this derivation shows explicitly how the frequency-dependent tortuosity α can play an important role in electrical conduction problems and how it may be measured using electrical methods. Another related issue for systems that are clay-rich is described next.

Clay-Rich Soils.

The complex nature of electrical conductivity in earth materials is attributed in part to zones of unequal ionic transport properties along the pore channels. These zones are caused by charged interfaces and pore constrictions. Interactions at or near the interfaces between solid and liquid phases are the main causes of the formation of electrical double layers. Clay-rich soils have an abundance of fixed negative charge sites that enhance cation- relative to anion-transport. Soils with higher clay content tend to produce larger $\sigma_i/\sigma_r$ than soils that are clay-free.

The results presented in Table 1 indicate that, as the permeability decreases, equation (5) together with (12) predict that the sensitivity of the ratio $\sigma_i/\sigma_r$ to the dependence on the lambda parameter Λ decreases. It is well-known that soils with increasing clay content tend to have increasing values of $\sigma_i/\sigma_r$ and also decreasing permeability $k_o$. This means that, for soils with significant clay content, modifications to equation (5), possibly related to those presented already in (11) and (12), will be needed to account properly for the phase effects due to zones of unequal ionic transport.

Other Methods.

Börner et al., 1996, referenced above, have proposed a method to use their so-called "spectral induced polarization technique" to estimate hydraulic conductivity. Their work assumes that: (1) phase angle is constant with respect to changes in frequency, (2) both interface conductivity and imaging components are linearly dependent on the surface area to porosity ratio, and (3) the ratio $\sigma_i/\sigma_r$ is independent of fluid composition. The key to their approach is the development of empirical relationships using laboratory data which relates $\sigma_r$ and $\sigma_i$ to pore space geometry and other rock parameters, such as specific surface area or hydraulic radius.

The present approach does not make any of the simplifying assumptions made by Börner et al., 1996. Furthermore, a major objective of this approach is to make use of established theoretical relationships among $\sigma_i$, $\sigma_r$, and $\tilde{k}(\omega)$.

Data Example

FIG. 1 graphically illustrates an example of electrical impedance data collected on saturated sand/clay mixtures plotted as resistivity and phase as a function of frequency, with a frequency range of $10^0$ to $10^5$ HZ.

As indicated above, these two parameters contain all the information necessary to plot the data in any one of the four immittance formalisms. These data in these two diagrams clearly demonstrate dispersion. Both the resistivity magnitude and phase angle vary appreciably over the limited frequency range of this data set ($10^0$ to $10^5$ Hz, 4 points per decade of frequency). Plotted in the complex resistivity plane, we see that the imaginary part of the resistivity varies between 2 and 80 Ωm and the real part from 160 to 280 Ωm, or from 0.5 to 0.007 expressed as the ratio of imaginary to real resistivities. Other materials suitable for study here should have similar responses.

The measurement of impedance magnitude |Z| and phase φ over the frequency range $10^{-3}$ to $10^5$ Hz, at a rate of data collection of 5 to 8 points per decade of frequency, provides sufficient data coverage to estimate the lambda parameter. FIGS. 2A and 2B illustrate magnitude and phase tomographs obtained in a water tank where a magnitude and phase anomaly was created by inserting a sand and lead-pellet mixture. In the target, as indicated by the arrows in each of FIGS. 2A and 2B and as shown on the bar graphs, the resistivity magnitude (FIG. 2A) is in ohm-m and the resistivity phase (FIG. 2B) is in radians, the frequency being 4 Hz.

While particular examples, etc., have been set forth to teach the principles of the invention, such are not intended to be limiting. Modifications and changes may become apparent to those skilled in the art, and it is intended that the invention be limited only by the scope of the appended claims.

The invention claimed is:

1. A method for mapping subsurface hydraulic conductivity, comprising:
    using electrical impedance tomography by:
        providing amplitude measurements,
        providing phase measurements, and
        utilizing the amplitude and phase measurements for making complex electrical conductivity measurements for mapping subsurface hydraulic conductivity by electrical impedance tomography.

2. The method of claim 1, wherein the amplitude and phase measurements are made in a frequency dependent electrical conductivity measurement.

3. A method using electrical impedance tomography to map subsurface hydraulic conductivity of a porous medium, comprising:
    providing amplitude and phase measurements,
    making complex electrical conductivity measurements using the amplitude and phase measurements, and
    analyzing the thus-made complex electrical conductivity measurements in terms of a direct measure of the appropriate length scale of the porous medium.

4. The method of claim 3, wherein the complex-electrical conductivity measurements include examining both the amplitude and the phase in a frequency dependent electrical conductivity measurement.

5. The method of claim 4, wherein the frequency dependent measurements are utilized to determine the permeability or hydraulic conductivity of the subsurface.

6. The method of claim 4, wherein the measurements are carried out in a measurement system which provides high data acquisition speed, high accuracy in the phase measurement, and a wide bandwidth.

7. The method of claim 6, wherein the measurement system includes a 16-channel receiver capable of multiplexing any combination of 30 electrodes giving it a data speed of up to 2000 measurements per hour and operates within a frequency domain between 0.0625 and 8000 Hz.

8. A method for mapping subsurface hydraulic conductivity comprising:
using electrical impedance tomography by:
providing resistivity magnitude measurements,
providing resistivity phase measurements,
the resistivity magnitude on the resistivity phase measurements being made in a frequency-dependent electrical conductivity measurement, and
utilizing the magnitude and phase measurements for making complex electrical conductivity measurements for mapping subsurface hydraulic conductivity by electrical impedance tomography.

9. The method of claim 8, wherein the frequency-dependent electrical conductivity measurement is in the frequency range of $10^0$ to $10^5$ Hz.

* * * * *